(12) United States Patent
Channabasappa et al.

(10) Patent No.: US 9,514,295 B2
(45) Date of Patent: Dec. 6, 2016

(54) QUANTIFIED IDENTITY

(71) Applicant: Cable Television Laboratories, Inc., Louisville, CO (US)

(72) Inventors: Sumanth Channabasappa, Broomfield, CO (US); Oscar G. Marcia, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 186 days.

(21) Appl. No.: 14/291,035

(22) Filed: May 30, 2014

(65) Prior Publication Data

US 2015/0347736 A1    Dec. 3, 2015

(51) Int. Cl.
| | |
|---|---|
| *H04L 29/00* | (2006.01) |
| *G06F 21/33* | (2013.01) |
| *G06F 21/31* | (2013.01) |
| *G06F 21/34* | (2013.01) |
| *G06F 21/35* | (2013.01) |
| *G06F 21/36* | (2013.01) |
| *G06Q 10/00* | (2012.01) |

(52) U.S. Cl.
CPC ............... *G06F 21/33* (2013.01); *G06F 21/31* (2013.01); *G06F 21/34* (2013.01); *G06F 21/35* (2013.01); *G06F 21/36* (2013.01); *G06Q 10/00* (2013.01)

(58) Field of Classification Search
CPC .......... H04L 9/32; H04L 29/00; G06F 21/00
USPC .......................................................... 726/19
See application file for complete search history.

(56) References Cited

U.S. PATENT DOCUMENTS

| | | | |
|---|---|---|---|
| 8,707,458 B2 * | 4/2014 | Malaney ............. | H04L 63/0492 702/150 |
| 2012/0144201 A1 * | 6/2012 | Anantha ............... | H04L 9/0897 713/172 |

* cited by examiner

*Primary Examiner* — Brandon Hoffman
*Assistant Examiner* — Michael D Anderson
(74) *Attorney, Agent, or Firm* — Great Lakes Intellectual Property, PLLC.

(57) ABSTRACT

Determination of a quantified identity using a multi-dimensional, probabilistic identity profiles is contemplated. The quantified identity may be used to authenticate a user entity provided to a point-of-sale device or other interface associated with identity requester in order to verify the corresponding users as who they say they are. The user identity may be determined initially as a function of user inputs made to the identity requester and/or as a function of wireless signaling exchange with devices associated with the user.

16 Claims, 10 Drawing Sheets

| Element | Authentication & Verification | Location | Proximity to other Elements |
|---|---|---|---|
| Cellphone | +0.1: authenticated | +0.1: as expected | +0.1: close to all |
|  | -1: unverifiable or unexpected | -0.1: unverifiable | 0: unverifiable |
|  |  | -1: unverifiable or unexpected | -1: one or more is not close enough |
| Presence of On-body device (e.g., smart pedometer) | +0.1: authenticated | +0.1: as expected | +0.1: verified on-body |
|  | -1: unverifiable or unexpected | 0: incapable | 0: unverifiable |
|  |  | -1: unexpected | -1: unexpected |
| Smart keys (e.g., automobile) | +0.1: authenticated | +0.1: as expected | +0.1: verified on-body |
|  | -1: unverifiable or unexpected | 0: incapable | 0: unverifiable |
|  |  | -1: unexpected | -1: unexpected |
| In-Body smart product (e.g., insulin pump) | +0.1: authenticated | +0.1: as expected | +0.3: verified in-body |
|  | -1: unverifiable or unexpected | 0: incapable | 0: unverifiable |
|  |  | -1: unexpected | -1: unexpected |

Fig. 10

QUANTIFIED IDENTITY

TECHNICAL FIELD

The present invention relates to determining a quantified identity as a function of a user identity or other user identifying characteristics requiring additional verification mode about the user, such as to provide identity authentication to an identity requestor according to a multi-dimensional, probabilistic identity profile.

BACKGROUND

The identity and authentication needs of today rely on either physical entities that you "own or rent" (e.g., set-top box, cable modem, credit card, mobile phone), what you "know" (e.g., username & password), or both (e.g., as one form of two-factor authentication). For instance, people can use their cable account to access HBO content on their tablet or their Amazon account to make a pledge on Kickstarter. Some identity and authentication needs are starting to explore facial recognition, retinal scans and voice recognition—either as independent mechanisms. Current mechanisms require users to either be near these authorized entities (e.g., at home for a cable box), or "remember" certain information (e.g., passwords). Alternative mechanisms are not always secure, e.g., voice recognition is weak, unless you add additional monitoring and facial recognition opens up privacy concerns.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

One non-limiting aspect of the present invention describes how a Quantified Identity idea may be realized. It starts by describing the logical entities that may be utilized for this invention, followed by the relationships to be established and the message flow during a runtime transaction illustrated as a flow chart with a sample use case and a high-level architectural view and the associated algorithms to bring this idea to fruition.

Figure 1:
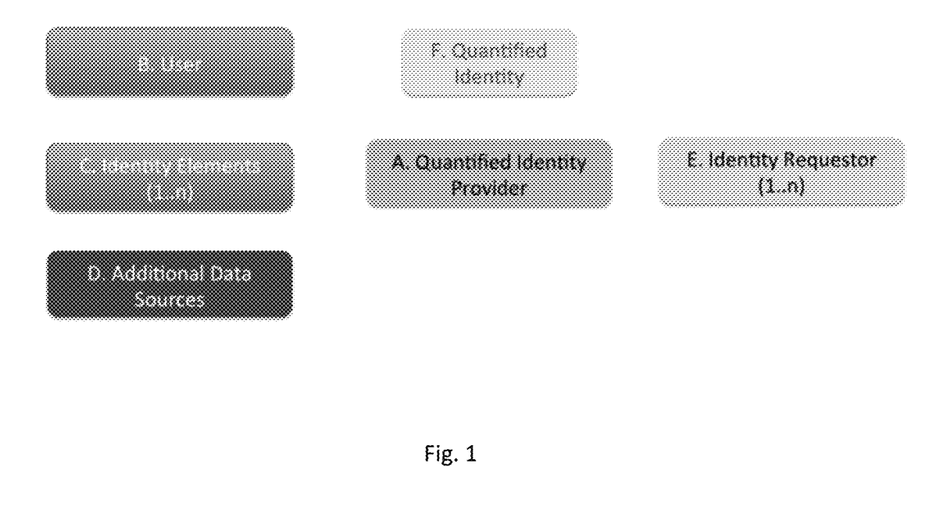
FIG. 1 illustrates a quantified identity system in accordance with one non-limiting aspect of the present invention.
Figure 2:
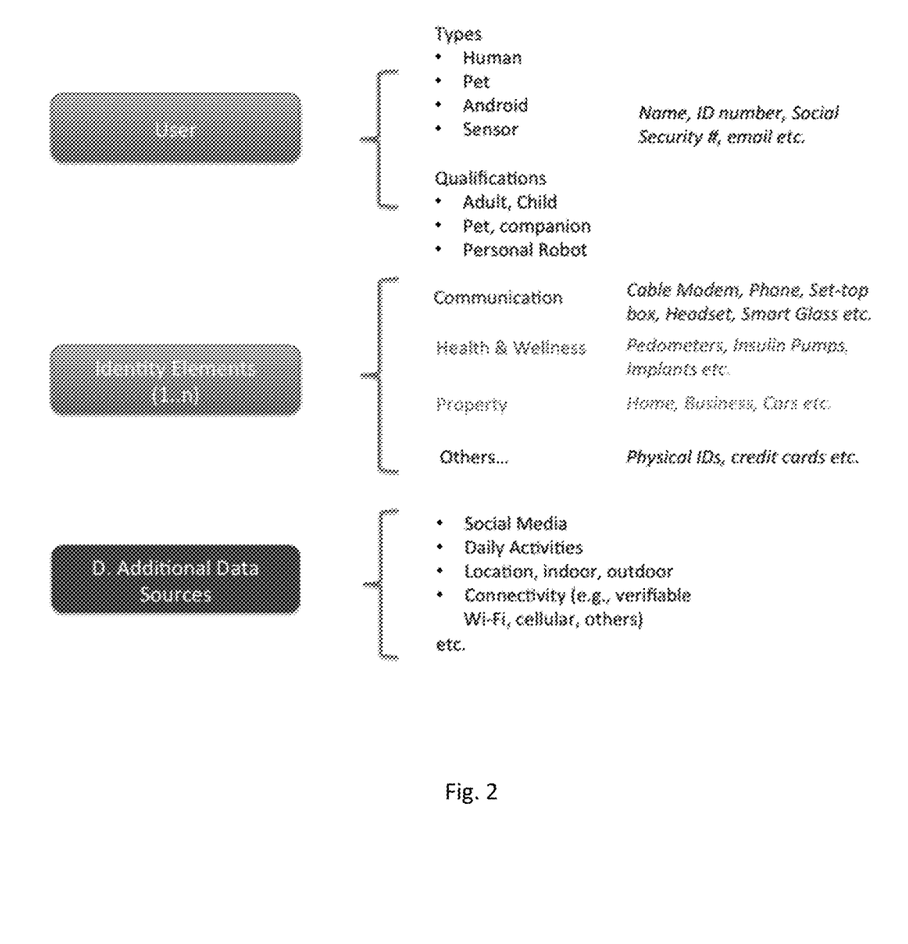
FIG. 2 illustrates a non-exhaustive description of associations in accordance with one non-limiting aspect of the present invention.

FIG. 1 and FIG. 2 list the logical entities of interest, and a brief description of a subset of the elements, respectively.

A. Quantified Identity Provider (QIP)

This is the service provider who can provide a quantified identity for a given user, based on communication with the associated identity elements and any additional data sources. Similar to identity providers (e.g., single sign-on providers), there may be more than one quantified identity provider in the market.

B. User

This is the entity whose Quantified Identity is provided by the QIP. This can refer to humans, pets, androids, or anything that needs an identity. It can also be qualified into sets, such as adult or child. See additional examples in FIG. 2.

C. Identity Elements

These are the elements that can help identify the User. As shown in FIG. 2, this can be a wide variety of communication, health or other devices. One requirement may be for these devices to be able to communicate with each other, and for at least one of them to be able to communicate with the QIP (the Primary ID Element). When you have a collection of such elements, it is referred to as an "Identity Element Set".

D. Additional Data Sources

In addition to the identity element set, the QIP may rely on outside sources. For instance, social media indicators, personal location history, travel history etc. to refine the QI appropriately. For instance, to flag cases where the user has a lower probability of being there, even though there are sufficient identity elements to suggest otherwise.

E. Identity Requestor

This is anyone who needs the Quantified Identity. This could be a merchant, whose establishment (or website) that the user wishes to make a purchase from. It can also be a business that is attempting to allow (or disallow) the user.

F. Quantified Identity (QI)

The QME determine the quantified identity of a user at a given point in space and time. The QI may be a probabilistic indicator, whose value depends on the likelihood of the user being the entity he/she/it claims to be, based on the identity element set and any additional data sources.

Figure 3:
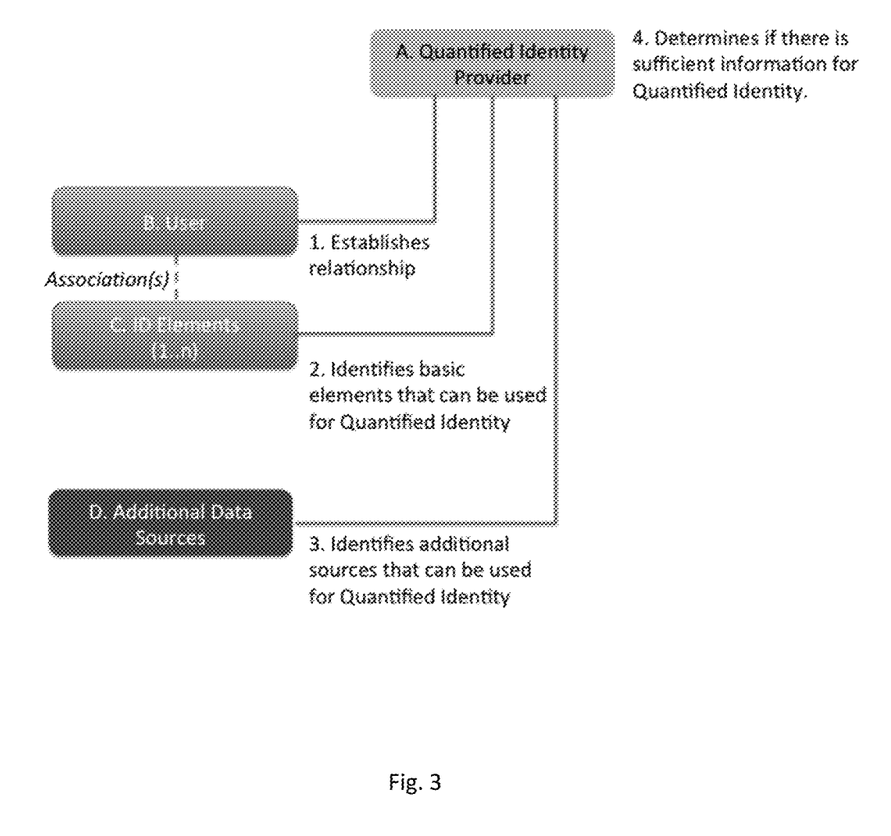
FIG. 3 illustrates establishment of quantified identity service in accordance with one non-limiting aspect the present invention.
Figure 4:
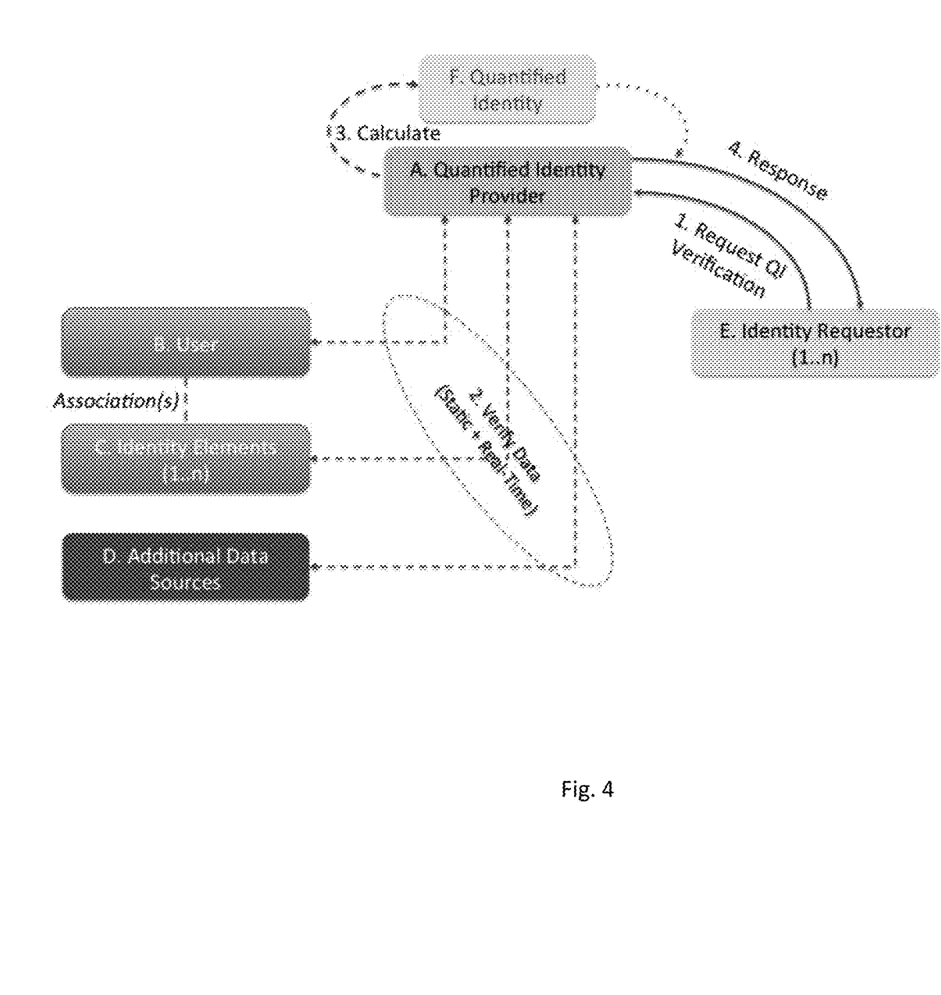
FIG. 4 illustrates a run time transaction in accordance with one non-limiting aspect of the present invention.
Figure 5:
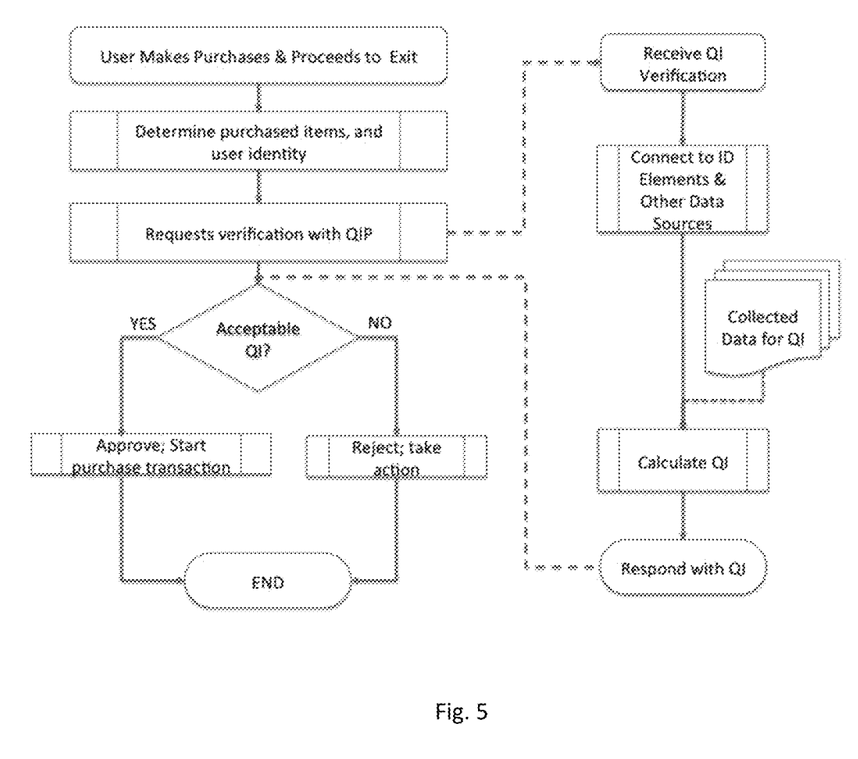
FIG. 5 illustrates a store purchase through a point-of-sale device in accordance with one non-limiting aspect of the present invention.

FIG. 3 shows the basic setup, where the QIP establishes a relationship with the user, and determines if there are enough identity elements for a QI. Once established, a simplified request and response message flow is shown in FIG. 4. This message flow is shown with some additional detail in FIG. 5.

Figure 6:
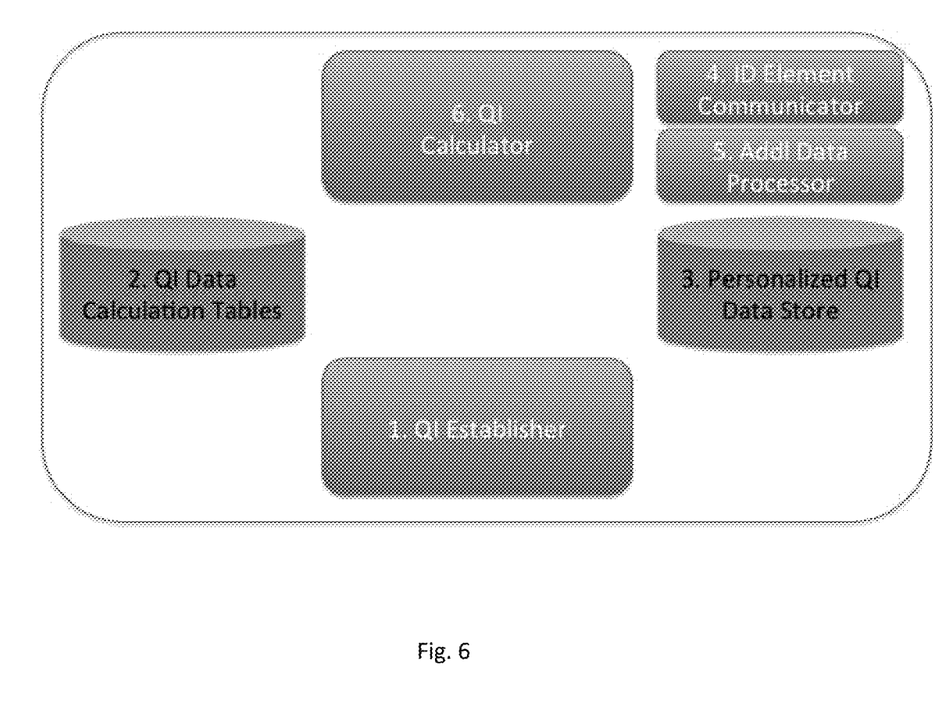
FIG. 6 illustrates a quantified identity provider logical architectural elements in accordance with one non-limiting aspect of the present invention.

To be a provider of QI, multiple elements are required. A subset of these are presented in FIG. 6.

1. QI Establisher

This establishes the ID elements that are associated with a user, and whether they are acceptable or not for QI calculation. It does this by ensuring that there is a way to communicate and authenticate these elements; for instance, by communicating with the device provider, or the provider of the service(s) provided by the device. It then establishes and maintains the weight data: both general and personal. For instance, if an ID element is reported misplaced or stolen, it may update the personal QI data store. If a certain ID element is susceptible to compromised credentials, then it may reduce its weight in the QI Data Calculation Tables. ID elements can be added, removed or modified at run-time, and this element can re-verify its use when such events occur.

2. QI Data Calculation Tables

These are the generic calculation weights that are determined by the QIP, for each element. These may be added, modified, or deleted over time via the QI establisher, or other elements within the QIP. See FIG. 7 for an example. This will allow onboarding of new users, for broadly impacting actions (e.g., compromised device credentials) and similar uses.

Figure 7:
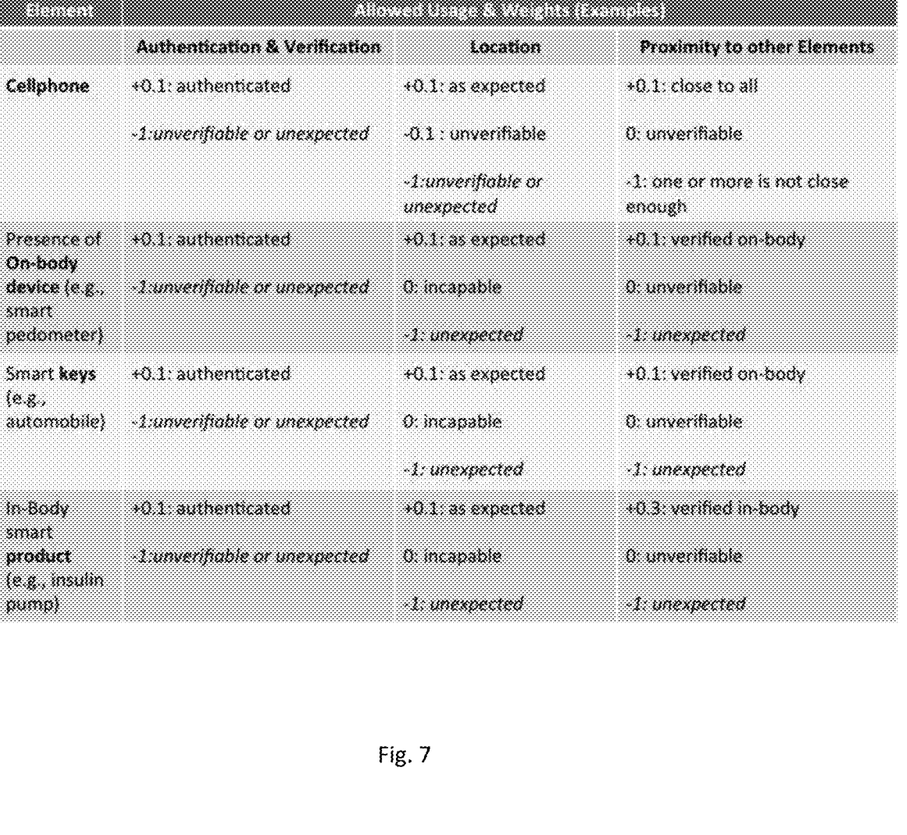
FIG. 7 illustrates QI data calculation tables in accordance with one non-limiting aspect of the present invention.
Figure 8:
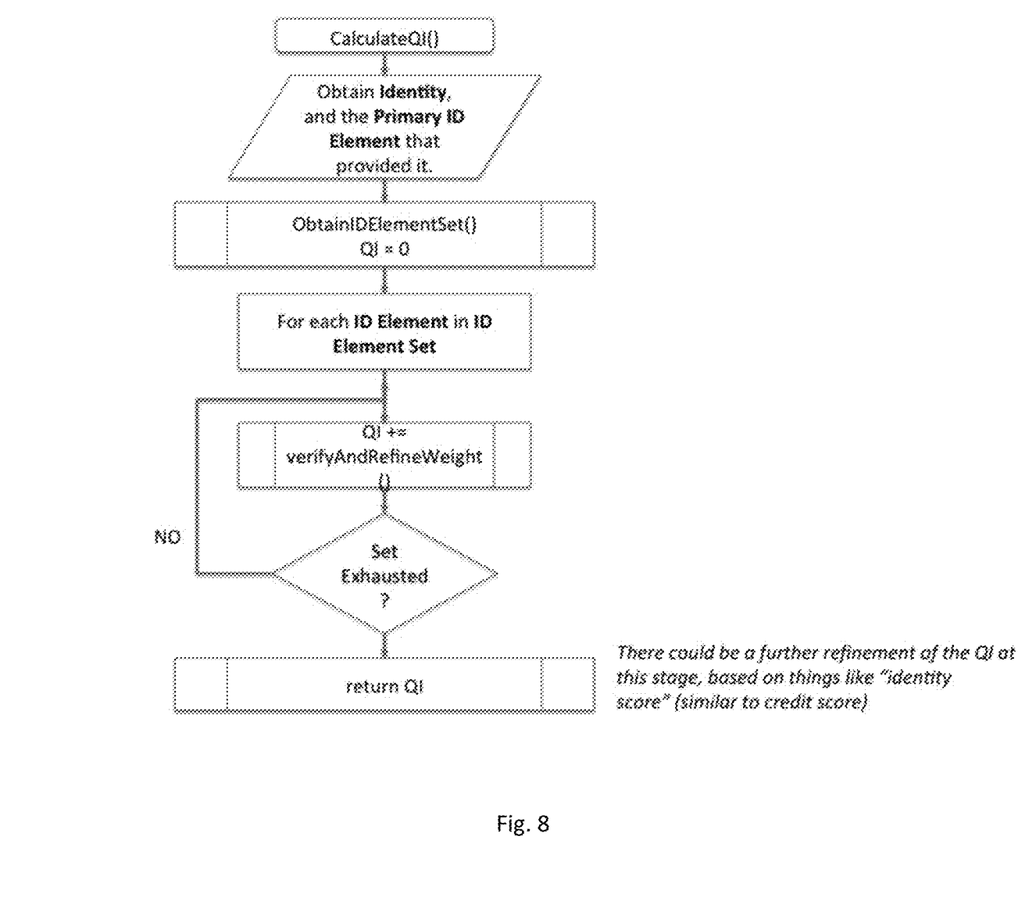
FIG. 8 illustrates a QI calculation algorithm in accordance with one non-limiting aspect of the present invention.
Figure 9:
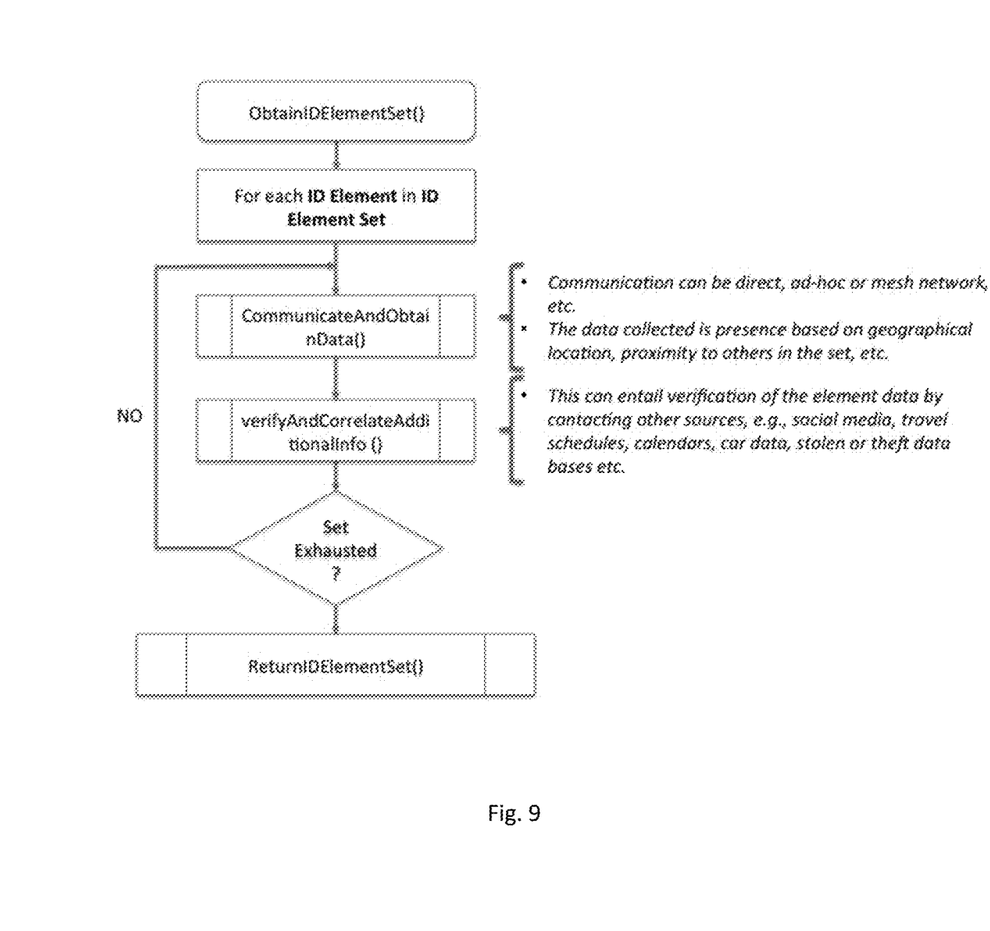
FIG. 9 illustrates the gathering of the ID element set associated with the user, which includes identity elements that are pre-approved and/or non-certificated elements, such as additional data sources; in accordance with one non-limiting aspect of the present invention.
Figure 10:
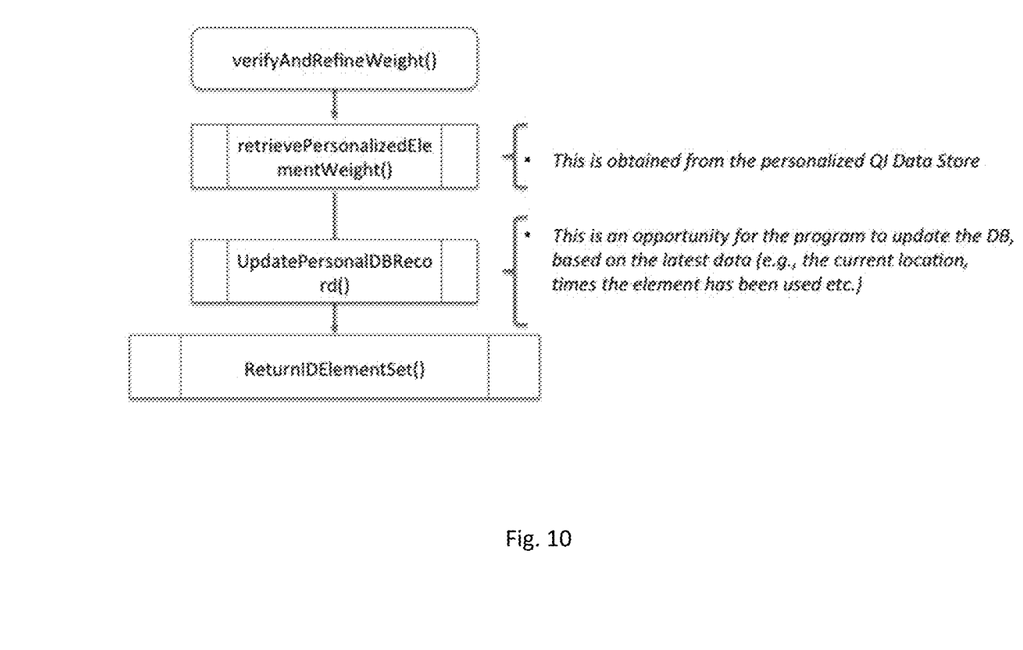
FIG. 10 illustrates generating weighted values and dynamically changing weight values as users attempt identification in accordance with one non-limiting aspect of the present invention.

FIG. 7 provides a sample data calculation table. As shown, this considers a handful of elements that can be used for QI calculation, when they form an ID Element Set. This is when a Primary ID Element can communicate with the QIP, and the rest of the elements can communicate with each other via direct communication to the primary, or via peer-connections. The weights shown are examples, and each QIP is anticipated to choose values that they deem appropriate.

The table provides values for authentication and verification, location, and proximity categories. The values can be additive, neutral, or subtractive. The positive values are when the elements are as expected. For instance, they are authenticated, in a location that is expected (e.g., based on accessible schedules, social media, or data analytics based on habits) and all the elements in the Identity Element Set are in near proximity (based on wireless connection strength, or similar mechanisms). Neutral values are used when an element is incapable of providing the expected designation (e.g., a smart pedometer may not have a GPS for location).

If an element that is part of a set is removed or flagged (e.g., because it was stolen, replaced, etc.) then they can be "unexpected", if there is an attempt to have them behave as though they were part of the ID Element Set. For instance, someone steals multiple items that have been flagged and attempts impersonation. Negative values can also be used when there is a mismatch in expectations. For example, if the person is anticipated to be Location X according to their travel schedule, and their cellphone GPS shows Y. Proximity is used to help prevent, or mitigate, cases where someone attempts to take advantage of closeness to a person. For example, one could steal one element (e.g., cell phone) and try to impersonate the owner by being close to their home where they know the other elements are likely to be.

3. Personalized QI Data Store

This is a refinement of the QI data calculation tables, on a per user basis. This will employ learning algorithms to refine weights based (e.g., based on usage patterns) at the individual or group level. For instance, if the user is found to carry the same set of ID elements most of the time, then this combination may be provided a better weight rating for refinement or a requirement to have this data set for a greater value.

4. ID Element Communicator

This communicates with the ID elements. It may try to designate one of the ID elements as the Primary Element, e.g., based on the QI data calculation table, or others (e.g., communication medium, security etc.). This primary element may become the conduit for other elements. Alternatively, the ID element communicator may just speak to different elements independently. When one is designation the primary, then this can help communicate with the rest, e.g., via local mesh or ad-hoc networks. For example, if the primary ID element is a cell phone then it can communicate with a car, smart pedometer, and keys via Bluetooth. Mechanisms to secure such connections (e.g., via shared credentials, X.509) are either provided by the QIP, by the respective service providers, or a combination.

5. Additional Data Processor

This element captures additional data about a user via interfaces to data sources outside of the ID elements. For instance, social media usage patterns, travel schedules, events etc. The data collected is used to raise "red flags" or refine the weights.

6. QI Calculator

This is the element that makes the final call on the QI calculations, e.g., the translator may add up each of the weighted values depending on the associated conditions in categories listed in the data calculation table. This is based on all of the weights, with any refinements and corrections. The quantified identity may correspond with a summation of the weight values relative to a threshold such that a total exceeding the threshold may indicate the user is who they say they are and a total less than the threshold may indicate the user is posing as someone else.

Any number of factors may be considered when determining the threshold or otherwise authenticating the user. Depending on availability of the identity elements and/or that additional data sources, the threshold may be increased or decreased, e.g., the threshold may be higher when less sources are available than when more element/sources are available.

One non-limiting aspect of the present invention proposes a mechanism to create a "Quantified User Identity" that capitalizes on the proliferation of personal devices and ubiquitous communication for personalization, authentication, authorization, secure communications, etc. Given the ever-increasing computing power, the present invention contemplates moving on from single-factor authentication (e.g., "what you know", such as a password) to multi-factor authentication (e.g., "what you know AND have", password+RSA Key). With the increasing number of devices that one is starting to carry (e.g., personal health care devices such as the Fitbit, or your smart car keys) this is now becoming multi-dimensional (e.g., "what all do you have?"). This invention proposes: use of multi-dimensional aspects to create a probabilistic identity profile that is quantified in conjunction with time, location, and proximity and/or to enable users to move away from a user-entry system (such as a password or credit card) to logical identification.

Here are a couple of use cases:

Easier Shopping: A person walks into a grocery store, picks up whatever (s)he wants to purchase, and walks out. No need for explicit authentication or checkout, i.e., no credit card, mobile or verbal payments.

Easier Access: A person turns on the TV in a hotel room and is automatically able to access his/her content without having to choose or select.

One non-limiting aspect of the present invention contemplates using a central identity provider, sensors, and probabilistic security, such as a "Quantified Identity Provider (QIP)" (e.g., NetworkFX) provides a user with a digital identity, such as an X.509 certificate. This certificate uniquely identifies the user (e.g., via an SSN, which could be encrypted for privacy). This can then be associated with any number of cable devices (e.g., STBs, cable modems, phones) and non-cable devices (e.g., mobile phones, cars, sensors) etc. It can also be associated with modes of payment (e.g., credit cards, cable account). The "Identity Provider" can then communicate with the associated devices, and share authorization tokens. This allows them to authenticate each other, or securely identify their association to an external entity. This association is then re-verified in the background in response to a request from an identity requestor by querying the QIP, thereby establishing a "Quantified Identity".

One use case may utilize three things a user may carry on their person: car keys, mobile phone, and personal health monitor (e.g., Fitbit). Assuming that there are no causes for concern, and the QIP can authenticate each of them as belonging to a particular user, the QIP or identity requestor can make a reasonable assumption that "a person" who has all three is as they say they are and not someone posing as that person. These three identity elements, and any additional identity elements or additional data sources, can communicate with each other, or with an external entity (e.g., a department or grocery store's payment system). If they are securely associated by a QIP, who verifies their associations to the user, then the identity requestor can obtain a probabilistic verification of my identity. The more associations you can verify, the stronger the identity. In this particular example, here are some events that could affect this, but can be recognized and flagged:

Car is notified that it has been stolen or the navigation system is disabled (indicating potential theft), which it relays to the car key (no communication implies it cannot authenticate).

Fitbit (or the App) recognizes an unusual gait pattern.

Mobile phone has not been connected to the network for a long time, or is not in an expected area.

For those concerned, reliable authentication based on physical devices that a person typically carries may be better than a username and a weak password, or a stolen credit card number. As the proliferation of devices increases—so will the precision of authentication contemplated by the present invention. Other factors that are going to make this even more precise are, as examples:

Personal (on-body or ingestible) or in-car sensors that can identify you based on biological characteristics (heart rhythm).

Big data analytics that can enhance or question your presence.

The use of a QIP, and a "user identity" allows for the associations to be changed dynamically, allowing for the user identity to adapt to changing devices and circumstances (e.g., when you move from one cable provider to another). The user can explicitly associate devices with themselves, or the connection happens automatically in the background:

For cable customers, this can be made when someone signs up using G2B.

Non-cable customers, say Fitbit (personal activity tracker), can establish a relationship with NetworkFX.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for determining a quantified identity for a user comprising: receiving a quantified identity (QI) request from an identity requester, the QI request indicating a user identity for the user; determining from a certificate uniquely associated with the user identity; determining from a certificate table or through certificate polling of a plurality of identity elements one or more user identity elements associated with the user identity, the user identity elements corresponding with each of the plurality of identity elements determined from the certificate table or the certificate polling as having been previously provided the certificate; determining from a calculation table or a calculation algorithm a plurality of weight values to represent whether the user identity elements are operating in a manner consistent with how the user indicated with the user identity would be engaged and/or disengaged with the plurality of identity elements proximate in time to receipt of the QI request; determining the quantified identity for the user as a function of the plurality of weight values, the quantified identity indicating whether the user identity indicated with the QI request is likely to be that of the user or someone posing as the user; adjusting the plurality of weight values as a function of data generated from one or more additional data sources, the additional data sources operating independently of the identity elements; and determining from one or more of the additional data sources a location of the user proximate in time to receipt of the QI request such that one or more of the plurality of weight values is increased when the location is within a wireless range of the identity requester and decreased when the location is beyond the wireless range of the identity requester.

2. The method of claim 1 further comprising indicating the user identity to be that of the user when a summation of the weight values is greater than a threshold and to be that of someone posing as the user if the summation is less than the threshold.

3. The method of claim 2 further comprising varying the threshold in proportion to a quantity of the user identity elements such that the threshold is greater when the quantity is larger and lower when the quantity is smaller.

4. The method of claim 3 further comprising limiting the user identity elements used for determining the plurality of weight values to the user identity elements determined to be in proximity to the identity requester proximate in time to receipt of the QI request such that at least a portion of the user identity elements are not used for determining the plurality of weight values.

5. The method of claim 4 further comprising determining the user identity elements to be in proximity to the identity requester in the event the corresponding user identity element is capable of wirelessly communicating directly with the identity requester or with another one of the identity elements capable of wirelessly communicating directly with the identity requester.

6. The method of claim 1 further comprising determining the plurality of weight values from the calculation table, the data calculation table defining weight values for each of the user identity elements.

7. The method of claim 6 further comprising determining the plurality of weight values such that each weight value is a summation of individual values listed within the data calculation table for an authentication and verification category, a location category and a proximity to other user identity elements category.

8. The method claim 7 further comprising determining the value for the authentication and verification category to be a first value for when the certificate of the corresponding user identity element is authenticated and a second value for when the certificate is unverifiable or unexpected, the first value being greater than the second value.

9. The method claim 7 further comprising determining the value for the location category to be a first value when a location of the corresponding user identity element is as expected, a second value when the location is unverifiable and a third value when the location is unexpected, the first value being greater than the second value and the second value being greater than the third value.

10. The method claim 7 further comprising determining the value for the proximity to other user identity elements category to be a first value when a proximity of the corresponding user identity element to the other plurality of identity elements is close, a second value when the proximity is unverifiable and a third value when the proximity is unexpected or not close enough, the first value being greater than the second value and the second value being greater than the third value.

11. A non-transitory computer-readable medium having a plurality of instructions operable with a processor and sufficient to facilitate determining a quantified identity (QI) for a user as a function of a user identity determined by an identity requester, the plurality of instructions being sufficient for: determining from a user table a plurality of certificates associated with the user identity; determining from a certificate table or through certificate polling a plurality of identity elements having one of the plurality of certificates associated with the user identity; determining based a requester location provided from the identity requester first identity elements of the plurality of identity elements having proximity to the identity requester less than a proximity threshold; determining based on the requester location provided from the identity requester second identity elements of the plurality of identity elements having proximity to the identity requester greater than the proximity threshold; assessing operation of the first and second plurality of identity elements as a function of communications or the lack of communications therewith; determining a plurality of weight values according to the assessed operation of first and second plurality of identity elements, the plurality of weight values representing whether the corresponding identity elements are operating in a manner sufficiently consistent with how the first and second plurality of identity elements should be operating proximate in time to receipt of the QI request; determining the quantified identity for the user as a function of the plurality of weight values, the quantified identity indicating whether the user identity determined by the identity requester is likely to be that of the user or someone posing as the user; determining a plurality of additional data sources associated with the user identity, the additional data sources providing additional data about the user associated with the user identity via interfaces separate from the first and second identity elements; utilizing the additional data to facilitate determining the quantified identity for the user by adjusting one or more of the plurality of weight values based on the additional data, including increasing at least one of the plurality of weight values when the additional data indicates the user is likely to be within a wireless signaling range of the identity requester or decreasing at least one of the plurality of weight values when the additional data indicates the user is unlikely to be within the wireless signaling range of the identity requester.

12. The non-transitory computer-readable medium of claim 11 further comprising instructions sufficient for: determining the first identity elements to have proximity less than the proximity threshold when within the wireless signaling range of the identity requester or within a second wireless signaling range of another one of the first identity elements within the wireless signaling range of the identity requester; and determining the second plurality of identity elements to have proximity greater than the proximity threshold when beyond the wireless signaling range of the identity requester insofar as the identity requester is unable to communicate directly with any one of the second identity elements.

13. The non-transitory computer-readable medium of claim 11 further comprising instructions for: determining the identity requester to be a point-of-sales device; and instructing the point-of-sale device to authenticate a sale to the user when the quantified identity indicates the user identity is likely to be that of the user and not to authenticate the sale when the quantified identity indicates the user identity is likely to be that of someone posing as the user.

14. The non-transitory computer-readable medium of claim 13 further comprising instructions sufficient for determining the user identity as a function of information included within an identity message transmitted from the point-of-sales device, the identity message being generated by the point-of-sales device in response to wireless signaling received from one or more of the first identity elements.

15. The non-transitory computer-readable medium of claim 14 further comprising instructions sufficient for determining the user identity is likely to be that of the user when the quantified identity is greater than an identity threshold and is likely to be that of someone posing as the user when the quantified identity is less than the identity threshold.

16. A non-transitory computer-readable medium having a plurality of instructions operable with a processor and sufficient to facilitate determining a quantified identity (QI), the plurality of instructions being sufficient for: registering a plurality of users for quantified identification; associating within a certificate table a plurality of certificates with a plurality of user identities associated with the plurality of users; receiving a quantified identity (QI) request from an identity requester, the QI request indicating a first identity of the plurality of user identities; determining a first plurality of identity elements having proximity to the identity requester less than a proximity threshold, each of the first plurality of identity elements including one of the plurality of certificates associated with the first identity; determining a second plurality of identity elements having proximity to the identity requester greater than the proximity threshold, each of the second plurality of identity elements including one of the plurality of certificates associated with the first identity; facilitating transmission of signals to each of the first and second plurality of identity elements, the first and second plurality of identity elements receiving the signals being configured to respond with a response message; assessing operation of the first and second plurality of identity elements as a function of the response messages received or not received from the first and second plurality of identity elements; determining a plurality of weight values according to a data calculation table that relates the plurality of weight values to the assessed operation of first and second plurality of identity elements, the data calculation table defining weight values as a summation of individual values as a function of assessed operation for an authentication and verification category, a location category and a proximity to other identity elements category; determining the quantified identity for the user as a function of the plurality of weight values, the quantified identity indicating whether the user identity determined by the identity requester is likely to be that of the user or someone posing as the user; and adjusting the plurality of weight values as a function of data generated from one or more additional data sources, the additional data sources operating independently of the first and second identity elements; and determining from one or more of the additional data sources a location of the user proximate in time to the QI request such that one or more of the plurality of weight values is increased when the location is within a wireless range of the identity requester and decreased when the location is beyond the wireless range of the identity requester.

* * * * *